(12) United States Patent
Leeper

(10) Patent No.: US 9,114,515 B1
(45) Date of Patent: Aug. 25, 2015

(54) LOCKING TAB HOLD DOWN SYSTEMS

(71) Applicant: James Leeper, Warsaw, IN (US)

(72) Inventor: James Leeper, Warsaw, IN (US)

( * ) Notice: Subject to any disclaimer, the term of this patent is extended or adjusted under 35 U.S.C. 154(b) by 252 days.

(21) Appl. No.: 13/869,029

(22) Filed: Apr. 24, 2013

Related U.S. Application Data

(60) Provisional application No. 61/671,914, filed on Jul. 16, 2012.

(51) Int. Cl.
*B25B 27/14* (2006.01)
*B60N 2/02* (2006.01)

(52) U.S. Cl.
CPC .. *B25B 27/14* (2013.01); *B60N 2/02* (2013.01)

(58) Field of Classification Search
CPC ......... B25B 24/14; B25B 27/146; B60N 2/02
USPC ............ 114/363; 24/270, 455, 457, 458, 570;
248/418, 503.1, 534; 29/235, 243.56,
29/270, 278; 296/65.03; 7/166; D8/382,
D8/394, 396
See application file for complete search history.

(56) References Cited

U.S. PATENT DOCUMENTS

| | | | | |
|---|---|---|---|---|
| D32,580 S | * | 4/1900 | Moule | D8/382 |
| 765,046 A | * | 7/1904 | Shee et al. | 24/457 |
| D151,597 S | * | 11/1948 | Clark | D8/394 |
| 2,825,952 A | * | 3/1958 | Van Driel | 24/570 |
| 3,991,968 A | * | 11/1976 | Yazejian | 248/501 |
| D273,454 S | * | 4/1984 | Pyles | D8/28 |
| 4,666,116 A | * | 5/1987 | Lloyd | 248/228.6 |
| 4,667,917 A | * | 5/1987 | Takace | 248/398 |
| 4,682,561 A | | 7/1987 | Jentry | |
| 4,750,252 A | * | 6/1988 | Homeyer | 29/426.6 |
| D310,185 S | * | 8/1990 | Tick | D11/182 |
| D316,525 S | * | 4/1991 | Waddell et al. | D10/64 |
| 5,125,711 A | * | 6/1992 | Syed et al. | 296/68.1 |
| 5,197,406 A | * | 3/1993 | Rabal et al. | 114/363 |
| 5,435,030 A | * | 7/1995 | Phillips | 7/138 |
| D399,715 S | * | 10/1998 | Budd, Sr. | D8/17 |
| D402,884 S | * | 12/1998 | Wood | D8/394 |
| 6,254,054 B1 | | 7/2001 | Few | |
| D472,189 S | * | 3/2003 | McCoy et al. | D12/162 |
| 6,941,621 B1 | * | 9/2005 | Wolforth et al. | 24/270 |
| 7,013,831 B1 | | 3/2006 | Garelick | |
| 7,143,708 B1 | * | 12/2006 | Cimino | 114/219 |
| 7,299,527 B1 | * | 11/2007 | Gyure et al. | 24/198 |
| 2005/0000067 A1 | * | 1/2005 | Gagnon et al. | 24/455 |
| 2006/0144315 A1 | | 7/2006 | Garelick | |

* cited by examiner

*Primary Examiner* — Lee D Wilson
*Assistant Examiner* — Tyrone V Hall, Jr.
(74) *Attorney, Agent, or Firm* — RG Patent Consulting, LLC; Rachel Gilboy

(57) ABSTRACT

A "J" shaped device for sliding around the base of a pedestal seat, which depresses the locking tab and unlocks the pedestal from the pedestal base, allowing a single person to use both hands to remove the seat and pedestal assembly for maintenance or cleaning.

18 Claims, 5 Drawing Sheets

LOCKING TAB HOLD DOWN SYSTEMS

CROSS-REFERENCE TO RELATED APPLICATION

The present application is related to and claims priority from prior provisional application Ser. No. 61/671,914, filed Jul. 16, 2012 which application is incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR 1.71(d).

The following includes information that may be useful in understanding the present invention(s). It is not an admission that any of the information provided herein is prior art, or material, to the presently described or claimed inventions, or that any publication or document that is specifically or implicitly referenced is prior art.

BACKGROUND OF THE INVENTION

1. Field of the Invention

The present invention relates generally to the field of locking tab releases and more specifically relates to a locking tab hold down device to release the locking tab on a pedestal seat so one person can remove the seat and pedestal on a boat.

2. Description of the Related Art

Many people use boats for recreation and/or work. Most boats have seating; some have bench seats and others may have pedestal seats. It may be desirable at times to remove the seating. When removing pedestal seats from a boat, it can be difficult to depress the safety tab while simultaneously pulling up on the chair. After several days of sitting on the chair, the seat can become stuck in the mount, making it even more difficult to pull out. If an individual is exerting force on the chair to release it from the mount, another person must be holding down the safety tab. Often there may not be more than one person available, causing the task to take longer. If an individual attempts to hold down the safety tab while also trying to pull up on the chair, they may strain a muscle in his/her back. A convenient tool that depresses the safety tab allowing a person to remove pedestal chairs single-handedly is desirable.

Various attempts have been made to solve the above-mentioned problems such as those found in U.S. Pat. No. 6,941,621 to Wolforth; U.S. Pat. No. 6,254,054 to Few; and U.S. Pat. No. 4,682,561 to Jentry. This art is representative of pedestal releasing means. None of the above inventions and patents, taken either singly or in combination, is seen to describe the invention as claimed.

Ideally, a locking tab hold down should provide ease of use and, yet would operate reliably and be manufactured at a modest expense. Thus, a need exists for a reliable locking tab hold down system to release a seat locking tab and allow a person to remove a seat pedestal without help from another person and to avoid the above-mentioned problems.

BRIEF SUMMARY OF THE INVENTION

In view of the foregoing disadvantages inherent in the known locking tab art, the present invention provides a novel locking tab hold down system. The general purpose of the present invention, which will be described subsequently in greater detail is to provide a locking tab hold down and allow a person to safely remove a seat pedestal without help from another individual.

The locking tab hold down device holds the safety tab down on a seat post, allowing a user to remove the pedestal without having to reach under the seat to hold the tab while lifting simultaneously. The locking tab hold down device makes it possible for virtually anyone to remove a seat post by themselves, helping to perform maintenance safely and efficiently. Even seats that are stuck in place can be easily removed single-handedly. Individuals will no longer have to reach and strain to depress the safety tab while also lifting in the opposite direction, helping to prevent injury. The locking tab hold down device can be used by boat owners, marinas, manufacturers, dealers, repair facilities, on vehicles which use pedestal seats.

A locking tab hold down system is disclosed herein, in a preferred embodiment, comprising a locking tab hold down device comprising a top side having a flat planer surface, a bottom side having a flat surface, a finger grasping aperture, and an outer surface (having a first edge, a second edge, a third edge, a fourth edge, a fifth edge, a sixth edge; the sixth edge useful for engaging a seat pedestal locking tab; a seventh edge, an eighth edge, a ninth edge, and a tenth edge). The locking tab hold down device is defined by and comprises in combination: the top side, the bottom side, and the outer surface. The outer surface is defined by and comprises in combination: the first edge, the second edge, the third edge, the fourth edge, the fifth edge, the sixth edge, the seventh edge, the eighth edge, the ninth edge, and the tenth edge. The fifth edge, the sixth edge, the seventh edge, the eighth edge, and the ninth edge engage about the seat pedestal in use. The first edge, the second edge, the third edge, the fourth edge, and the tenth edge do not engage the seat pedestal in use. The fifth edge, the sixth edge, the seventh edge, the eighth edge, and the ninth edge engage the seat pedestal, thereby enabling disengaging the seat pedestal locking tab from a locked condition to an unlocked condition. The finger grasping aperture travels between the top side and the bottom side, and is useful for grasping the locking tab hold down device.

The finger grasping aperture is usable as a hanging means to store the locking tab hold down device on a vertical surface (such as a wall or the like) during non-use periods. The locking tab hold down device has a J-shape profile, and preferably comprises dimensions of about ¼ inch thick, by about 5 inches long, by about 4½ inches in width. The flat surface of the bottom side provides that the locking tab hold down device is able to be slidably placed around a seat pedestal of a pedestal-seat such that a locking tab hold-down is able to be disengaged allowing the seat pedestal of the pedestal-seat to be removed from a seat-pedestal-base. The sixth edge useful for engaging the seat pedestal locking tab, thereby allowing the pedestal-seat to be removed from a boat. The locking tab hold down device is rotationally locked around the seat pedestal via a clockwise motion, the sixth edge engaging the seat pedestal locking tab, thereby unlocking the seat pedestal locking tab as the locking tab hold down device is rotated clockwise around the seat pedestal allowing a user to remove the seat pedestal without help from another person. The device can be made in many sizes to fit and work on different sized pedestals.

The locking tab hold down device further comprises a kit including: a locking tab hold down device, and a set of user instructions.

A method of use for the locking tab hold down device is also disclosed herein comprising the steps of: slidably placing a locking tab hold down device around a seat pedestal of a pedestal-seat, rotating a locking tab hold down device in a clock wise motion (thereby unlocking a seat pedestal locking tab), sliding a seat pedestal out of a seat pedestal base, and removing a locking tab hold down device. The method may further comprise the step of storing the locking tab hold down device on a wall between uses.

The present invention holds significant improvements and serves as a locking tab hold down device. For purposes of summarizing the invention, certain aspects, advantages, and novel features of the invention have been described herein. It is to be understood that not necessarily all such advantages may be achieved in accordance with any one particular embodiment of the invention. Thus, the invention may be embodied or carried out in a manner that achieves or optimizes one advantage or group of advantages as taught herein without necessarily achieving other advantages as may be taught or suggested herein. The features of the invention which are believed to be novel are particularly pointed out and distinctly claimed in the concluding portion of the specification. These and other features, aspects, and advantages of the present invention will become better understood with reference to the following drawings and detailed description.

BRIEF DESCRIPTION OF THE DRAWINGS

The figures which accompany the written portion of this specification illustrate embodiments and method(s) of use for the present invention, a locking tab hold down device, constructed and operative according to the teachings of the present invention.

The various embodiments of the present invention will hereinafter be described in conjunction with the appended drawings, wherein like designations denote like elements.

DETAILED DESCRIPTION

As discussed above, embodiments of the present invention relate to a seat pedestal release device and more particularly to a locking tab hold down device as used to improve the ability of one person to remove a seat pedestal from a seat pedestal base with relative ease.

Generally speaking, the locking tab hold down is a tool used to assist in the removal of a seat post pedestal from the pedestal base on a boat. This tool may be constructed from strong extruded poly-plastic or other suitable material. The tool can be shaped (formed) from one piece, roughly in the shape of a capital "J". The tool may be about ¼" thick by about 5" long by about 4.5" in width in preferred embodiments. To use, the user hooks the bottom of the "J" on the tab and turns the long side of the tool around the pedestal, where it locks over the safety tab to hold it down. The seat can then be lifted from the post with two hands.

Figure 1:
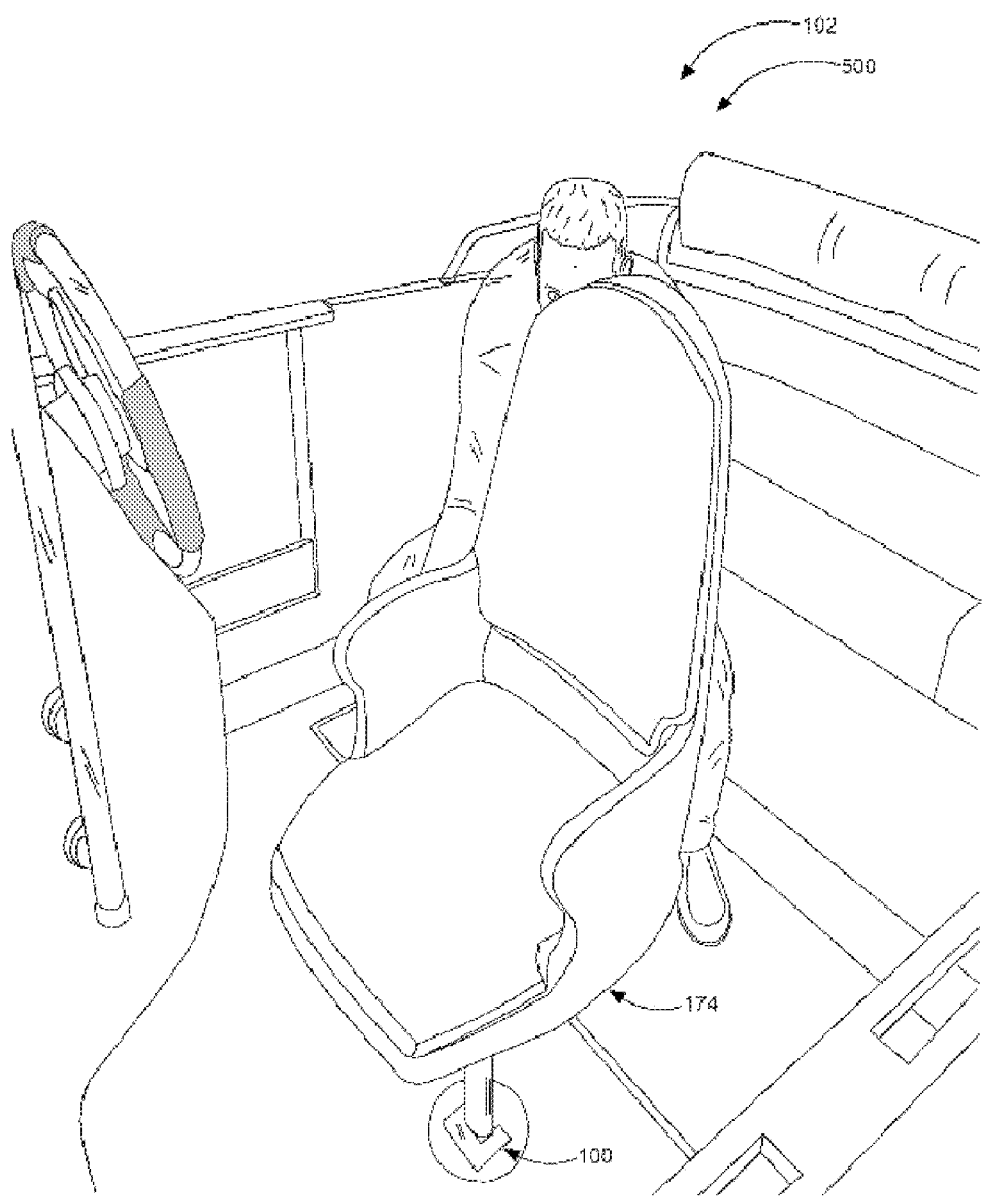
FIG. 1 shows a perspective view illustrating the locking tab hold down device in an in-use condition according to an embodiment of the present invention of FIG. 1

Referring to the drawings by numerals of reference there is shown in FIGS. 1-4, various views of locking tab hold down device according to an embodiment of the present invention; beginning with FIG. 1, a perspective view illustrating locking tab hold down device 100 in an in-use condition 102.

Locking tab hold down device 100 comprises top side 110 (having flat planer surface 112), bottom side 120 (having flat surface 122), finger grasping aperture 130, outer surface 140 having first edge 142, second edge 144, third edge 146, fourth edge 148, fifth edge 150, sixth edge 152; sixth edge 152 (useful for engaging seat pedestal locking tab 170), seventh edge 154, eighth edge 156, ninth edge 158, and tenth edge 160. Locking tab hold down device 100 is shown in greater detail in FIGS. 3 and 4.

Figure 2:
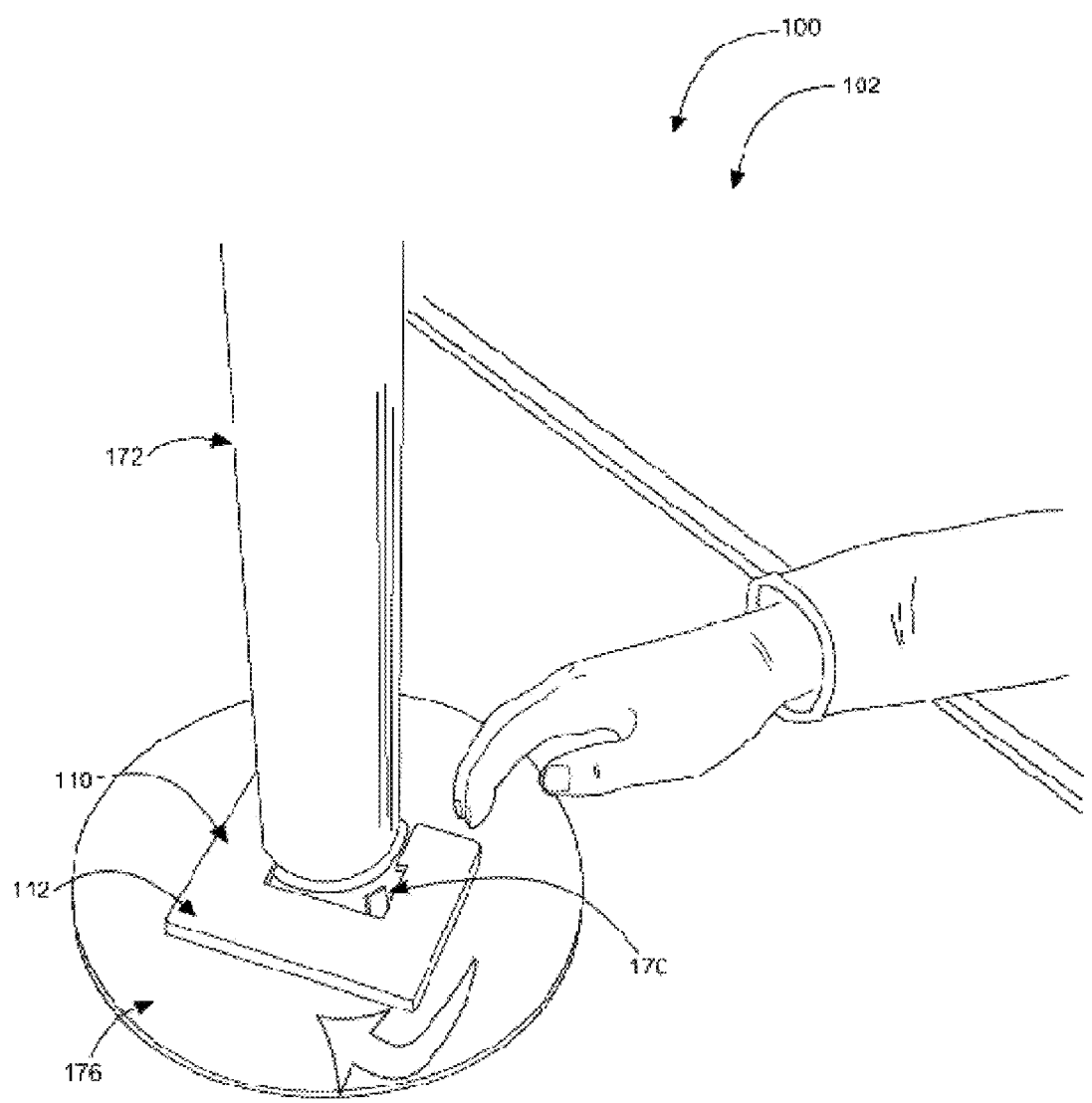
FIG. 2 is a perspective view illustrating the locking tab hold down device in relation to a pedestal seat according to an embodiment of the present invention of FIG. 1.

Referring now to FIG. 2, a top view illustrating locking tab hold down device 100 in an in-use condition 102 according to an embodiment of the present invention of FIG. 1.

Locking tab hold down device 100 comprises in combination: top side 110, bottom side 120, and outer surface 140, outer surface 140 and is defined by and comprises in combination: first edge 142, second edge 144, third edge 146, fourth edge 148, fifth edge 150, sixth edge 152, seventh edge 154, eighth edge 156, ninth edge 158, and tenth edge 160. Fifth edge 150, sixth edge 152, seventh edge 154, eighth edge 156, and ninth edge 158 engage about seat pedestal 172 in use, as also shown in FIG. 1. First edge 142, second edge 144, third edge 146, fourth edge 148, and tenth edge 160 do not engage seat pedestal 172 in use. Fifth edge 150, sixth edge 152, seventh edge 154, eighth edge 156, and ninth edge 158 engage seat pedestal 172, thereby disengaging seat pedestal locking tab 170 from a locked condition to an unlocked condition. In this way the present invention engages seat pedestal 172.

Figure 3:
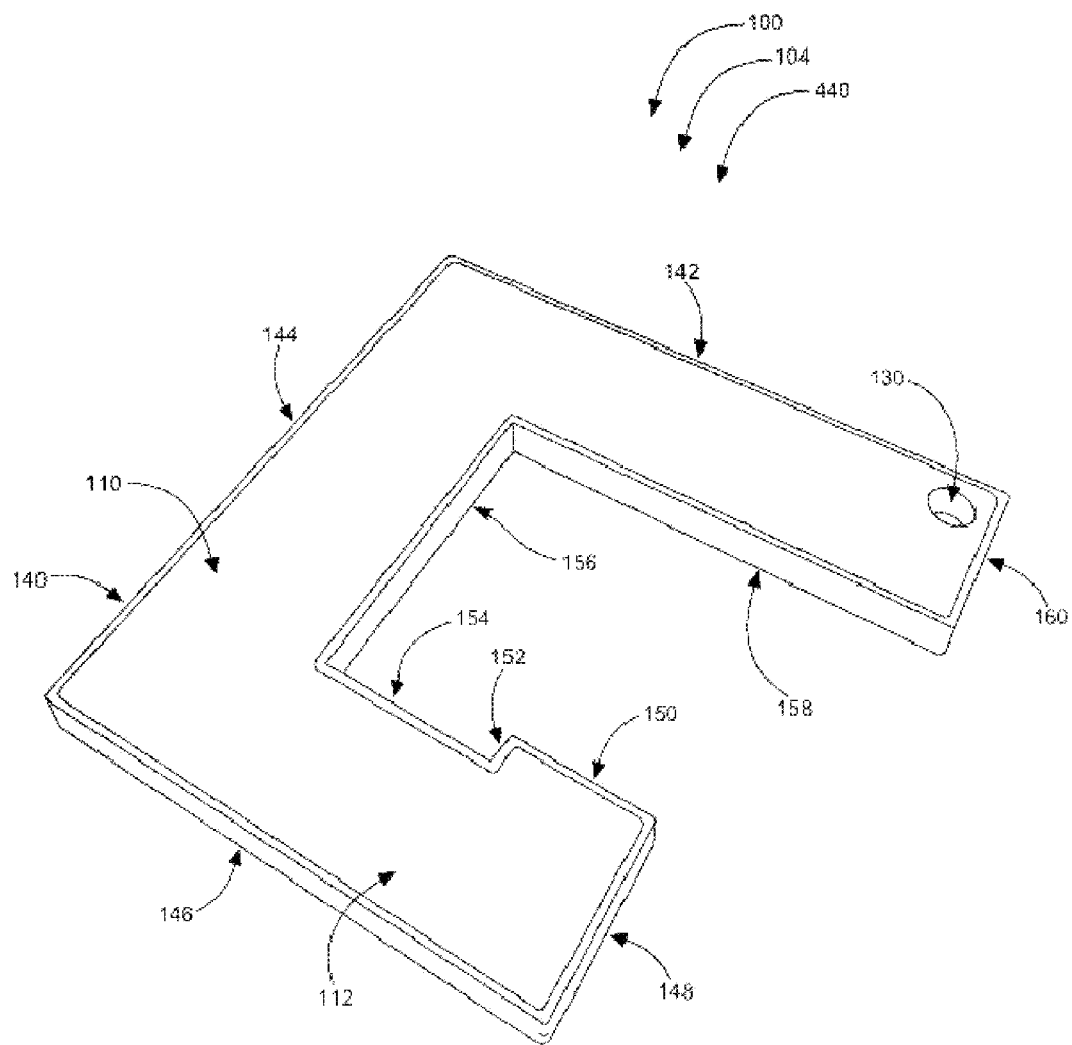
FIG. 3 is a top view illustrating the locking tab hold down device according to an embodiment of the present invention of FIG. 1.

Referring now to FIG. 3, a top view illustrating locking tab hold down device 100 according to an embodiment of the present invention of FIG. 1.

Finger grasping aperture 130 travels (traverses) between top side 110 and bottom side 120, and is useful for grasping locking tab hold down device 100. Finger grasping aperture 130 is usable as a hanging means to store locking tab hold down device 100 on a vertical surface during non-use periods. Locking tab hold down device 100 comprises a J-shape profile 104, and dimensions of about ¼ inch thick, by about 5 inches long, by about 4½ inches in width. Flat surface 122 of bottom side 120 provides that locking tab hold down device 100 is able to be slidably placed around a seat pedestal 172 of pedestal-seat 174 such that seat pedestal locking tab 170 is able to be disengaged, allowing seat pedestal 172 of pedestal-seat 174 to be removed from a seat-pedestal-base 176, as desired.

Figure 4:
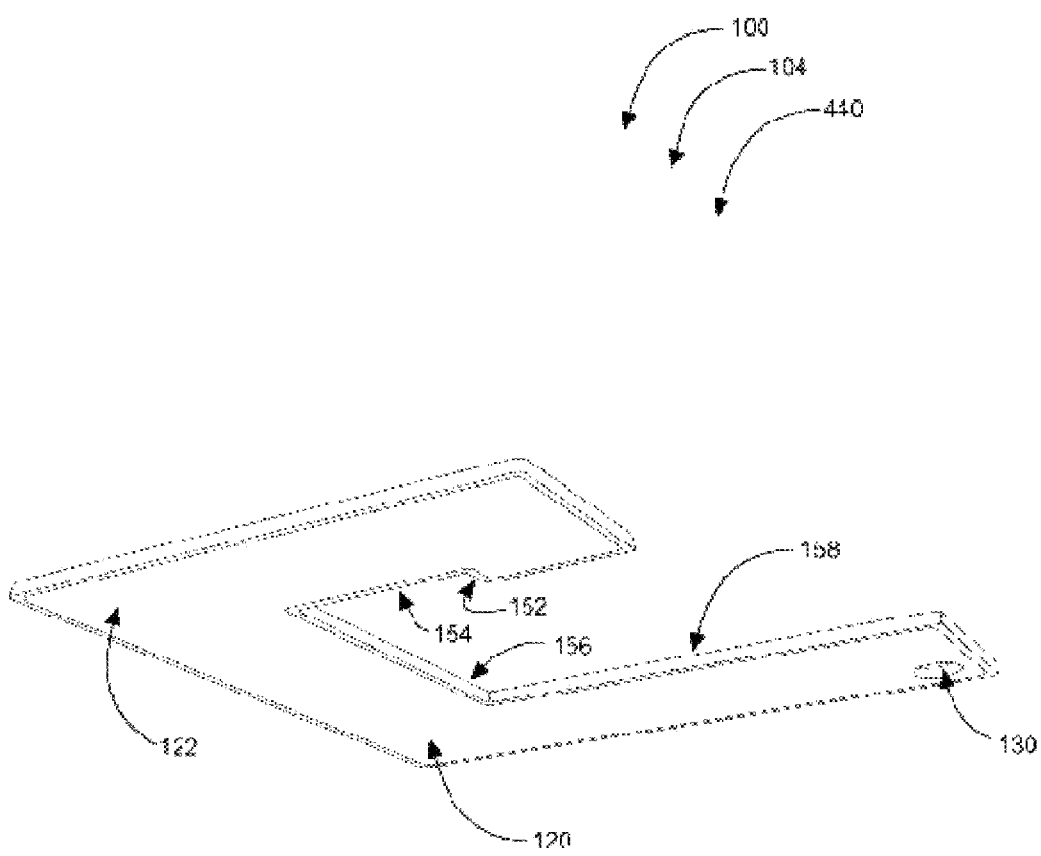
FIG. 4 is a side perspective view illustrating the locking tab hold down device according to an embodiment of the present invention of FIG. 1.

Referring now to FIG. 4, a side perspective view illustrating locking tab hold down device 100 according to an embodiment of the present invention of FIG. 1.

Sixth edge 152 of locking tab hold down device 100 is useful for engaging seat pedestal locking tab 170, allowing pedestal-seat 174 to be removed from a boat (or other such vehicle). Locking tab hold down device 100 is rotationally locked around seat pedestal 172 via a clockwise motion; sixth edge 152 engaging seat pedestal locking tab 170 thereby unlocking seat pedestal locking tab 170 allowing a user to remove seat pedestal 172 without help from another person. In this way the present invention Locking tab hold down device 100 further comprises kit 440 including: locking tab hold down device 100, and a set of user instructions. Locking tab hold down device 100 may be manufactured and provided for sale in a wide variety of sizes and shapes for a wide assortment of applications.

Figure 5:
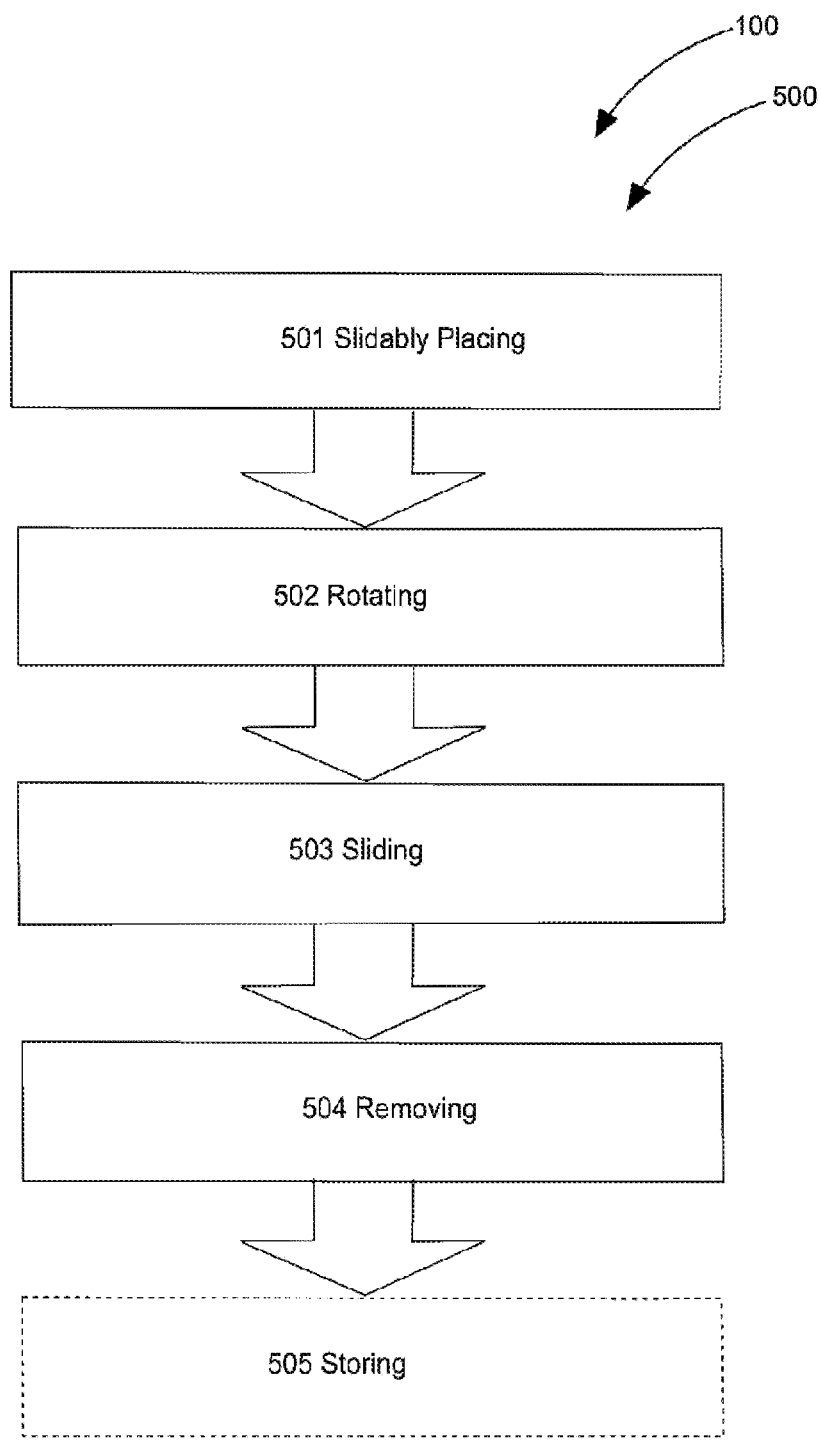
FIG. 5 is a flowchart illustrating a method of use for the locking tab hold down device according to an embodiment of the present invention of FIGS. 1-4.

Referring now to FIG. 5, a flowchart illustrating a method of use 500 for locking tab hold down device 100 according to an embodiment of present invention of FIGS. 1-4

A method of using (method of use 500) for locking tab hold down device 100 comprises steps of: step one 501 slidably placing a locking tab hold down device 100 around a seat pedestal 172 of a pedestal-seat 174, step two 502 rotating locking tab hold down device 100 in a clock wise motion, thereby unlocking seat pedestal locking tab 170, step three 503 sliding seat pedestal 172 out of seat pedestal base 176, and step four 504 removing locking tab hold down device 100. The method 500 may further comprise the step of 505 storing locking tab hold down device 100 between uses.

It should be noted that step 505 is an optional step and may not be implemented in all cases. Optional steps of method 500 are illustrated using dotted lines in FIG. 5 so as to distinguish them from other steps of method 500.

It should be noted that the steps described in method of use can be carried out in many different orders according to user preference. The use of "step of" should not be interpreted as "step for", in the claims herein and is not intended to invoke provisions of 35 U.S.C. §112, ¶6. Upon reading this specification, it should be appreciated that, under appropriate circumstances, considering such issues as design preference, user preferences, marketing preferences, cost, structural requirements, available materials, technological advances, etc., other methods of use arrangements such as, for example, different orders within above-mentioned list, elimination or addition of certain steps, including or excluding certain maintenance steps, etc., may be sufficient.

The embodiments of the invention described herein are exemplary and numerous modifications, variations and rearrangements can be readily envisioned to achieve substantially equivalent results, all of which are intended to be embraced within the spirit and scope of the invention. Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application.

What is claimed is new and desired to be protected by Letters Patent is set forth in the appended claims:

1. A pedestal-seat locking tab hold down system comprising:
   a) a pedestal-seat locking tab hold down device having
      i) a top side having a flat planer surface;
      ii) a bottom side having a flat surface;
      iii) a finger grasping aperture;
      iv) an outer surface having;
         (1) a first edge;
         (2) a second edge;
         (3) a third edge;
         (4) a fourth edge;
         (5) a fifth edge;
         (6) a sixth edge;
         (7) a seventh edge;
         (8) an eighth edge;
         (9) a ninth edge; and
         (10) a tenth edge;
   b) a boat pedestal-seat comprising;
      i) a seat pedestal;
      ii) a seat pedestal locking tab; and
      iii) a seat pedestal base;
   c) wherein said pedestal-seat locking tab hold down device solely comprises a material selected from plastics and metals;
   d) wherein said sixth edge is structured and arranged with said seat pedestal base and further structured and arranged with said seat pedestal locking tab for engaging said seat pedestal locking tab such that said top side is perpendicular to a longitudinal axis of said seat pedestal;
   e) wherein said locking tab hold down device is defined by and comprises in combination said top side, said bottom side, and said outer surface;
   f) wherein said outer surface is defined by and comprises in combination said first edge, said second edge, said third edge, said fourth edge, said fifth edge, said sixth edge, said seventh edge, said eighth edge, said ninth edge, and said tenth edge;
   g) wherein said finger grasping aperture is structured and arranged with said pedestal-seat locking tab hold down device between said top side and said bottom side;
   h) wherein said finger grasping aperture is structured and arranged with said pedestal-seat locking tab hold down device for grasping said pedestal-seat locking tab hold down device by a user;
   i) wherein said pedestal-seat locking tab hold down device comprises a J-shape profile;
   j) wherein said flat surface of said bottom side is structured and arranged with said locking tab hold down device and is further structured and arranged with said seat pedestal base to slidably position around said seat pedestal of said pedestal-seat and still further structured and arranged with said pedestal-seat locking tab hold down device whereby said user can remove said seat pedestal of said pedestal-seat from said seat-pedestal-base;
   k) wherein said sixth edge is structured and arranged with said seat pedestal base for engaging said seat pedestal locking tab;
   l) wherein said pedestal-seat locking tab hold down device is structured and arranged to rotate clockwise around said seat pedestal;
   m) wherein said pedestal-seat locking tab hold down device is structured and arranged with said seat pedestal locking tab to rotationally lock around said seat pedestal with only clockwise motion that engages said sixth edge with said seat pedestal locking tab whereby allowing said user to remove said seat pedestal without help from another person.

2. The locking tab hold down system of claim 1 wherein said fifth edge, said sixth edge, said seventh edge, said eighth edge, and said ninth edge engage about said seat pedestal in use.

3. The locking tab hold down system of claim 2 wherein said first edge, said second edge, said third edge, said fourth edge, and said tenth edge do not engage said seat pedestal in use.

4. The locking tab hold down system of claim 1 wherein said fifth edge, said sixth edge, said seventh edge, said eighth edge, and said ninth edge engage said seat pedestal, thereby disengaging said seat pedestal locking tab from a locked condition to an unlocked condition.

5. The locking tab hold down system of claim 4 wherein said pedestal-seat locking tab hold down device comprises dimensions of about ¼ inch thick, by about 5 inches long, by about 4½ inches in width.

6. The locking tab hold down system of claim 5 wherein said pedestal-seat locking tab hold down device is constructed from one piece of sheet material.

7. The locking tab hold down system of claim 6 wherein said pedestal-seat locking tab hold down device is constructed from extruded poly-plastic.

8. The locking tab hold down system of claim 6 wherein said pedestal-seat locking tab hold down device is stamped out of said sheet material when manufactured.

9. The locking tab hold down system of claim 7 wherein said pedestal-seat locking tab hold down device is injection-molded when manufactured.

10. The locking tab hold down system of claim 8 wherein said pedestal-seat locking tab hold down device comprises ferrous material.

11. The locking tab hold down system of claim 8 wherein said pedestal-seat locking tab hold down device comprises non ferrous material.

12. The locking tab hold down system of claim 1 wherein said pedestal-seat is removable from a boat.

13. The locking tab hold down system of claim 1 wherein said pedestal-seat is removable from a non-water vehicle.

14. The locking tab hold down system of claim 9 wherein said finger grasping aperture is is structured and arranged with said locking tab hold down device to form a hanging means to store said pedestal-seat locking tab hold down device on a vertical surface during non-use periods.

15. A locking tab hold down system comprising:
 a) a pedestal-seat locking tab hold down device having
  i) a top side having a flat planer surface;
  ii) a bottom side having a flat surface;
  iii) a finger grasping aperture;
  iv) an outer surface having;
   (1) a first edge;
   (2) a second edge;
   (3) a third edge;
   (4) a fourth edge;
   (5) a fifth edge;
   (6) a sixth edge;
   (7) a seventh edge;
   (8) an eighth edge;
   (9) a ninth edge; and
   (10) a tenth edge;
 b) a boat pedestal-seat comprising;
  i) a seat pedestal;
  ii) a seat pedestal locking tab; and
  iii) a seat pedestal base;
 c) wherein said pedestal-seat locking tab hold down device comprises a material selected from plastics and metals;
 d) wherein said sixth edge is structured and arranged with said seat pedestal base and further structured and arranged with said seat pedestal locking tab for engaging said seat pedestal locking tab;
 e) wherein said pedestal-seat locking tab hold down device is defined by and comprises in combination said top side, said bottom side, and said outer surface;
 f) wherein said outer surface is defined by and comprises in combination said first edge, said second edge, said third edge, said fourth edge, said fifth edge, said sixth edge, said seventh edge, said eighth edge, said ninth edge, and said tenth edge;
 g) wherein said fifth edge, said sixth edge, said seventh edge, said eighth edge, and said ninth edge engage about said seat pedestal in use;
 h) wherein said first edge, said second edge, said third edge, said fourth edge, and said tenth edge do not engage said seat pedestal in use;
 i) wherein said fifth edge, said sixth edge, said seventh edge, said eighth edge, and said ninth edge engage said seat pedestal, thereby disengaging said seat pedestal locking tab from a locked condition to an unlocked condition;
 j) wherein said finger grasping aperture travels between said top side and said bottom side;
 k) wherein said finger grasping aperture is useful for grasping said pedestal-seat locking tab hold down device;
 l) wherein said finger grasping aperture is usable as a hanging means to store said pedestal-seat locking tab hold down device on a vertical surface during non-use periods;
 m) wherein said pedestal-seat locking tab hold down device comprises a J-shape profile;
 n) wherein said pedestal-seat locking tab hold down device comprises dimensions of about ¼ inch thick, by about 5 inches long, by about 4½ inches in width;
 o) wherein said flat surface of said bottom side provides that said pedestal-seat locking tab hold down device is able to be slidably placed around a seat pedestal of a pedestal-seat such that a locking tab hold-down is able to be disengaged allowing said seat pedestal of said pedestal-seat to be removed from a seat-pedestal-base;
 p) wherein said sixth edge useful for engaging said seat pedestal locking tab;
 q) wherein said pedestal-seat is removable from a boat;
 r) wherein said pedestal-seat locking tab hold down device is rotationally locked around said seat pedestal via a clockwise motion; said sixth edge engaging said seat pedestal locking tab, thereby unlocking said seat pedestal locking tab as said pedestal-seat locking tab hold down device is rotated clockwise around said seat pedestal allowing a user to remove said seat pedestal without help from another person.

16. The locking tab hold down system of claim 15 comprising a kit including: said pedestal-seat locking tab hold down device, and a set of user instructions.

17. A method of use of the pedestal-seat locking tab hold down system of claim 15 comprising the steps of:
 a) slidably placing a pedestal-seat locking tab hold down device around a seat pedestal of a pedestal-seat,
 b) rotating said pedestal-seat locking tab hold down device in a clock wise motion,
 c) thereby unlocking a seat pedestal locking tab,
 d) sliding said seat pedestal out of a seat pedestal base, and
 e) removing said pedestal-seat locking tab hold down device.

18. The method of claim 17 further comprising the steps of storing said pedestal-seat locking tab hold down device.

* * * * *